Jan. 15, 1935.   C. V. FOULDS   1,987,819
PRESSURE REGULATOR
Filed May 29, 1930   4 Sheets-Sheet 1
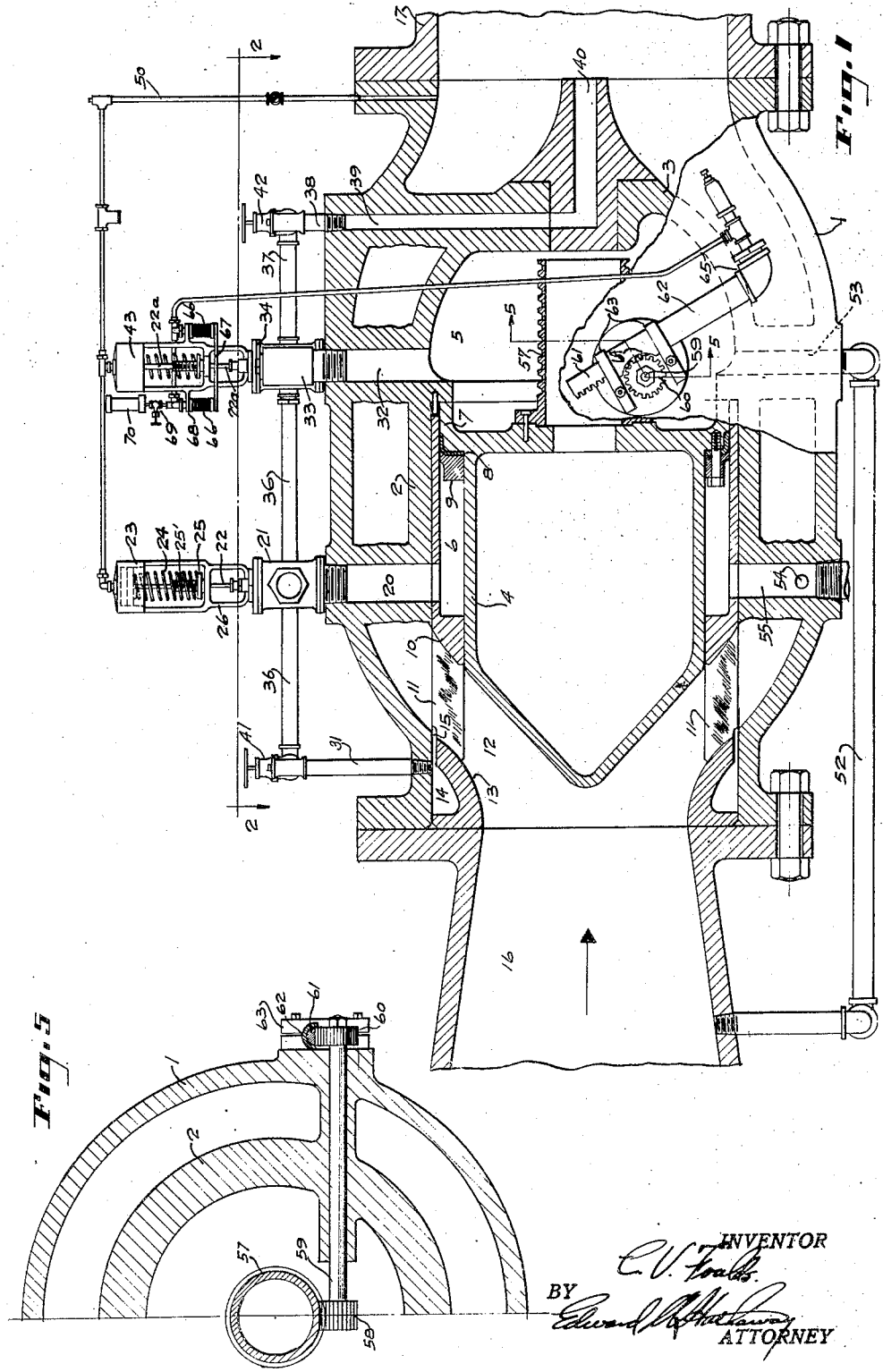

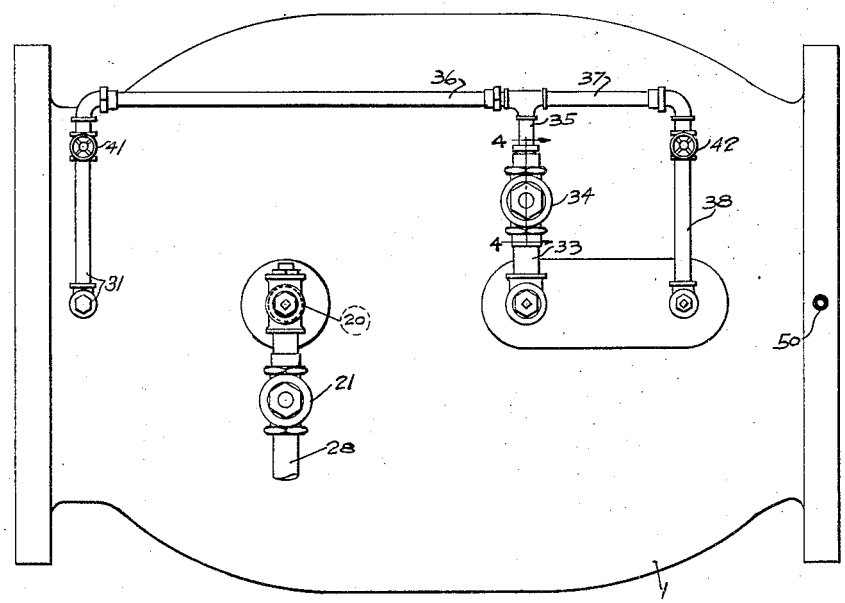
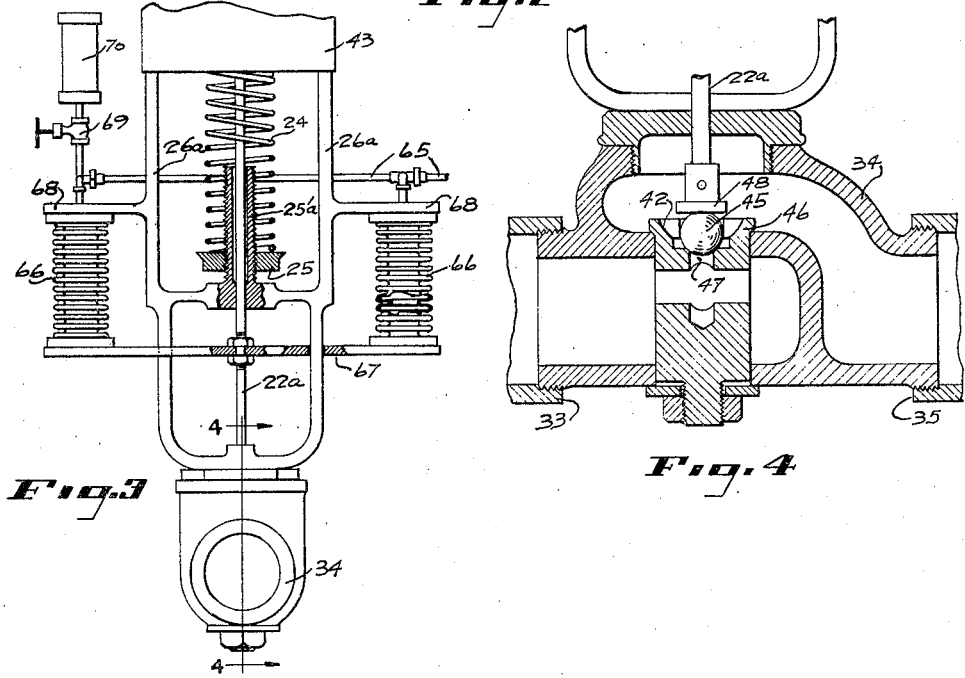

Jan. 15, 1935.    C. V. FOULDS    1,987,819
PRESSURE REGULATOR
Filed May 29, 1930    4 Sheets-Sheet 3

INVENTOR
C. V. Foulds
BY
Edward A. Hathaway
ATTORNEY

Jan. 15, 1935.   C. V. FOULDS   1,987,819
PRESSURE REGULATOR
Filed May 29, 1930   4 Sheets-Sheet 4

Patented Jan. 15, 1935

1,987,819

UNITED STATES PATENT OFFICE 1,987,819

PRESSURE REGULATOR

Charles V. Foulds, Berkeley, Calif., assignor to The Pelton Water Wheel Company, a corporation of California Application May 29, 1930, Serial No. 457,397

23 Claims. (Cl. 50—10)

This invention relates generally to valve mechanisms and controlling means therefor, and more particularly to pressure regulating valves adaptable to any of the various purposes for which such valves may be or are now used, the invention being especially applicable to the control of fluid flow in conduits of moderate or large size.

While my invention is particularly applicable to regulating pressure in a pipe line, such for instance, as in a city water distributing system, it will of course be understood that it may act as a pressure reducing valve in any conduit where it is desired to maintain a constant or practically constant lower pressure with wide variations of flow while being supplied from a conduit at a higher and variable pressure, or it may act as a pressure relief valve for maintaining a constant pressure in a conduit by discharging therefrom any flow that tends to raise the pressure, or as a metering valve for maintaining a constant flow from one conduit into another at lower pressure irrespective of what the pressure difference between the two might be, or as a throttling valve for the regulation of the flow in a conduit by manual or other control means or it may act in any other capacity within the scope of operation of its structure and control mechanism.

One object of my invention is to provide an improved valve and controlling means therefor for use in any of the above or other installations, and to provide an arrangement which is relatively simple in construction and operation and which will have minimum friction loss and will be generally reliable.

Reliability, stability of operation and freedom from wear are certain of the highly essential characteristics of a valve used particularly for pressure regulation such as in a water distribution system wherein the supply pipe and the distribution pipes may be several thousand feet in length. With such a length of pipe it is necessary to avoid as far as possible relatively rapid pressure variations or surges in the supply line and also in the distribution system for otherwise the pressure surges so created might require a long period of time to die out.

While my invention is particularly adapted, in certain of the details of its control, to meet most effectively and efficiently these peculiarly exacting conditions, it will of course be understood that where the conditions are less exacting the valve may be used for any of its several purposes without certain of the detailed refinements. While my improved control is adapted especially for cooperation with a Johnson type valve having its plunger movable to closed position against the flow, it may also be applied not only to a Johnson valve closing with the stream, but also to valves of other form, if appropriately constructed. This is accomplished merely by connecting the pipes which lead from the fluid operating internal and annular chambers or equivalent chambers to a point, preferably in the pipe line, of lower pressure than exists in the operating chambers, the location of such low pressure points being well understood in the art. In addition the control mechanism, including the control pipes and control valves therefor, may be employed for controlling a slide valve, pivot valve, or other suitable valve wherein, in each, the valve element is moved by fluid pressure through the medium of a suitable actuating motor such for example as a fluid operated piston and cylinder. In each case the fluid or power medium to the motor is controlled by my improved mechanism.

A further object of my invention is to provide improved means for stabilizing the operation and particularly the movements of a fluid operated movable piston which in the specific embodiment of the invention is in the form of an annular flange mounted upon a plunger, although other suitable piston arrangements may be used. A more specific object is to provide an improved fluid pressure restoring mechanism for the pilot regulator valve or where necessary it is applicable also to the auxiliary pilot regulator in the same manner.

Other objects and advantages will be readily understood by those skilled in the art, from the following description of the accompanying drawings illustrating two of the specific embodiments which the invention may assume, and in which—

Fig. 1 is a sectional view of the main valve, parts of the valve and also control valves and piping therefor being shown in elevation;

Fig. 2 is a plan view of the valve mechanism taken substantially on the line 2—2 of Fig. 1, to show the arrangement of the control piping;

Fig. 3 is an enlarged fragmentary elevational view showing part of the restoring mechanism and of the control valves;

Fig. 4 is an enlarged vertical section of the control valve taken substantially on the line 4—4 of Figs. 2 and 3;

Fig. 5 is a section of the rack and pinion mechanism for actuating the restoring mechanism, taken transversely of the main valve along a plane indicated by lines 5—5 on Fig. 1;

Figure 7:
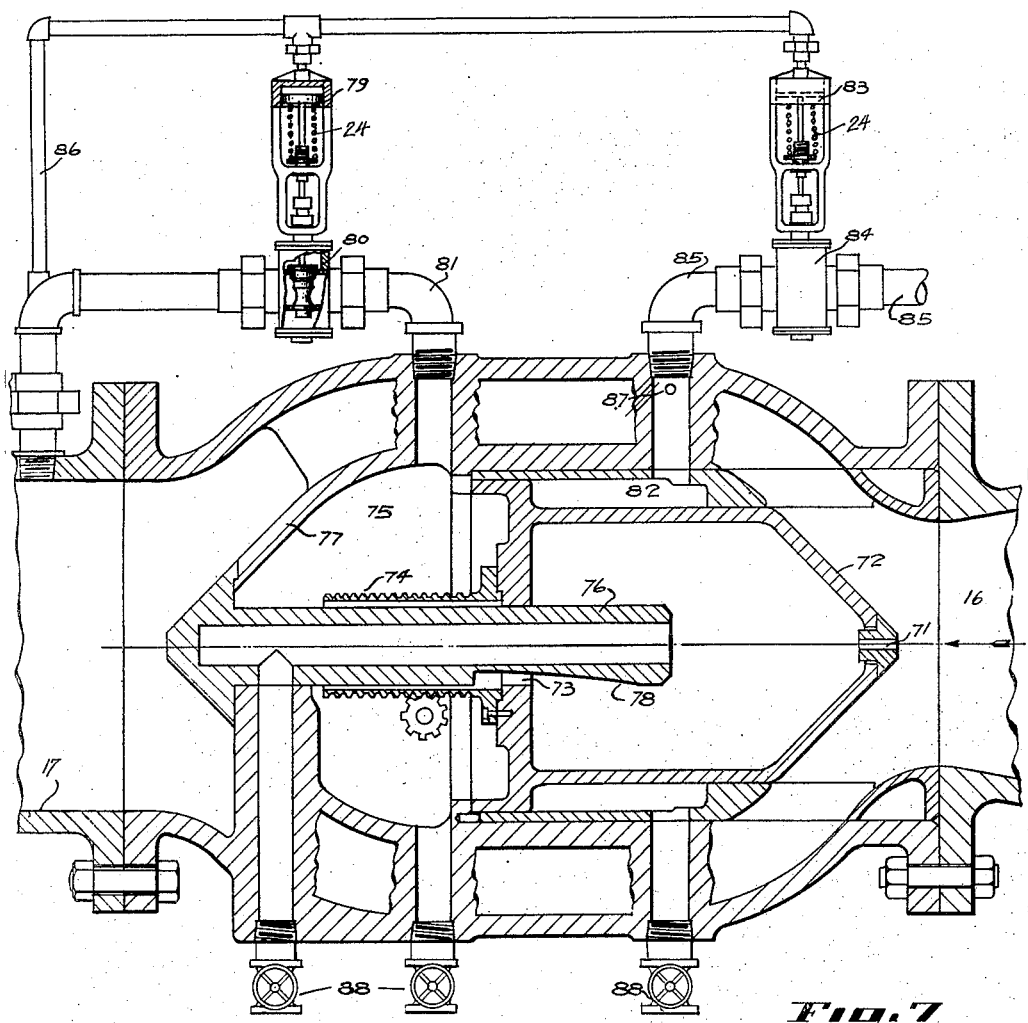
Fig. 7 is a vertical sectional view of a modified form of valve mechanism and control arrangement therefor, the latter being shown principally in elevation.

In the specific embodiment of my invention, I have shown for purposes of illustration a Johnson type of valve having an outer casing 1 and an inner casing 2 spaced therefrom to provide a usual annular fluid passageway therebetween. The inner casing has a closed downstream end 3 while the upstream end is provided with a plunger 4 slidably supported by, preferably within, the inner casing to form a central chamber 5 and an annular chamber 6. These two chambers are separated by an annular flange or piston 7 carrying, if desired, a leather cup packing 8, held in position by a suitable annular keeper ring 9. The plunger and position 7 slide within and are guided, preferably, by an integral combined bearing and guide member 10, which is circular in form and has webs 11 projecting forwardly therefrom across the annular passageway 12 to support a seating ring 13. The ring 13, webs 11 and member 10 are formed as an integral unit so as to provide a so-called basket construction. The seat ring 13 has a recess 14 defining a circular space around the conduit, this space communicating with passageway 12 as by a relatively narrow annular slot or ejector groove 15. The flow through the main valve is normally from a venturi of the upstream pipe 16 to the downstream pipe 17, and if the normal position of the plunger be considered as partially open, at which position it controls by throttling the flow between 16 and 17, the pressure in chamber 6 will be substantially equal to that in 17, due to leakage thru the clearance around the plunger and thru restricted orifice 54, while the pressure in 5 will be intermediate between those in 16 and 17, the exact value being such as to just balance the effects of the pressure and flow in 16 against the nose of the plunger. The pressure in 5 is able to produce a balance against the greater pressure in 16 by reason of the greater area of piston 7 as compared to the area exposed to the pressure and flow of 16. With such a state of equilibrium existing, it is obvious that an increase of pressure in 5 will cause movement of the plunger toward the closed position, while a decrease will cause an opening movement. It can be established, that with constant pressures maintained in 16 and 17, the pressure in 16 being higher than in 17, the total effect of the forces acting over the exposed area of the plunger due to pressure and velocity, becomes less as the plunger opening increases, and hence the pressure in 5 to balance this effect becomes less, and there is, therefore, a definite pressure in 5 corresponding to each position of the plunger, and any change in this pressure causes the plunger to take up the corresponding new position In other words, the plunger is truly in a state of stable equilibrium, in which, assuming pressures in 5, 16 and 17 to remain fixed, any displacement of the plunger, in either direction, will cause forces to be inherently produced to return it to the equilibrium position. It is obvious that such a condition is productive of great natural stablity of action.

A passage 20 leading to annular chamber 6 is provided with an auxiliary pilot regulator valve generally indicated at 21 which may be of any usual form such as a balanced spool valve as shown in the modified form of my invention or of the type shown in connection with a control valve for the chamber 5 and to be presently described. In either case the control valve is actuated by a stem 22 operatively connected to a fluid pressure expansible mechanism generally indicated at 23 and which may be a piston and cylinder or sylphon bellows well known in the art. If a bellows is used, the lower end is free and connected to the valve stem 22, while the upper end of the bellows is fixed against movement. A spring 24 is interposed between the lower side of the movable fluid actuated element 23 and an adjustable collar 25 suitably adjustably threaded on, for instance, a spindle projecting up from the frame 26 which holds the control valve and actuating means therefor in rigid relation. Control valve 21 is normally held closed by spring 24, and only when the fluid pressure in element 23 is sufficient to compress the spring 24, does it open to discharge the fluid in chamber 6 to atmosphere.

To control fluid pressure in the central chamber 5, a passage 32 is connected by a pipe 33 to one side of control valve 34 while the other side thereof (Figs. 1 and 2) is connected by a pipe 35 to either pipe 36 or pipe 37. These latter pipes in turn communicate with alternate regions of low pressure in the downstream conduit 17, either by pipe 38 and passages 39 and 40, extending through a suitable web connecting the inner and outer casings, or by pipes 36 and 31 to recess 14. The pipes 36 and 38 are each provided with manually operable valves 41 and 42 so that either or both of the points of low pressure may be used.

The fluid pressure actuating means generally indicated at 43 for the regulator valve 34 is substantially the same as the actuating means 23 except that the control valve 34 is closed upon downward movement of the fluid actuated movable member in the mechanism 43. The spring for resisting downward movement and the collar for adjusting the spring are the same as the mechanism 23. While the control valve 21 is preferably of the balanced type, the other control valve 34 is, in the specific embodiment of the invention, of the unbalanced type in that a free ball valve 45 is used. This ball valve is guided by a relatively small number of webs 46 and seats upon a suitable bevelled seat surrounding a passage 47 which is of relatively small cross sectional area and communicates with pipe 33 leading to the central chamber 5 through passage 32. The lower end of the actuating stem 22a is provided with a suitable collar 48 for moving the ball valve to its seat upon admission of pressure fluid to the fluid actuating means 43 or upon a predetermined drop of pressure therein the ball valve is moved from its seat by pressure in the central chamber thereby permitting discharge of fluid from the central chamber into discharge pipe 35.

To control the operation of the auxiliary regulator 23 and regulator valve 43 in accordance with pressure variations in the conduit a small pipe 50 is adapted to transmit the pressure in the downstream side of the main valve simultaneously to each of the fluid operated regulator devices 23 and 43. In one phase of the operation assume that pilot regulator 34 (central chamber control) is adjusted to begin closing when the regulated pressure rises to 65 lbs. and to be fully shut when the pressure rises to 70 lbs., and that auxiliary pilot regulator 23 (annular chamber control) is adjusted to begin opening when the regulated pressure rises to say 75 lbs. and to be fully open when the pressure rises to say 80 lbs. Then with the plunger valve in some normal intermediate position, and a downstream pressure of say 67 lbs. and increase in pressure in the downstream pipe to say 68 lbs. will be transmitted to the regulators 23 and 43 so as to close slightly regulator valve 34. Auxiliary regulator valve 21, which is closed, will remain closed as it does not begin to open until the pressure rises to say 75 lbs. The result is that fluid pressure begins to build up in the central chamber 5, as it is supplied from a source of high pressure, such as an enlarged portion of the venturi or upstream pipe 16, through a pipe 52 and a passage 53 leading to central chamber 5. Plunger 4 then gradually moves or tends to move, in the closing direction, to the position corresponding to equilibrium for the higher pressure in 5. If the downstream pressure continues to rise, the plunger will continue to move in the closing direction and when it reaches 70 lbs. regulator valve 34 will be entirely shut, thus causing the pressure in 5 to equal that in 16 and hold the plunger tight against its seat. The control valve 21 will normally be closed during this operation, thus preventing discharge of fluid from the annular chamber 6 through the passage 20, the pressure fluid in the annular chamber being discharged through a fit between plunger 4 and member 10 as is well known, and the pressure remaining substantially equal to that in 17. On the other hand, if the downstream pressure still continues to rise to say 75 lbs., due to some obstruction interfering with the free closure of plunger 4, auxiliary pilot regulator 23 will then start to open its valve 21 so as to permit a discharge of fluid from the annular chamber 6 through passage 20, valve 21, and pipe 28 to atmosphere, thereby reducing the pressure in chamber 6 and producing an increased closing force on plunger 4 to overcome the friction resisting the closure of the plunger. If, however, the downstream pressure still persists in increasing, then when the pressure reaches say 80 lbs. control valve 21 will be entirely opened, thus reducing pressure in the annular chamber to atmosphere and producing the maximum force to close the plunger.

A further function of valve 21 is to establish normal operating conditions when the apparatus is put in service, either for the first time or following a disturbance of the normal conditions. Thus if the valve had been standing idle with the plunger at or near the full open position and if it were to be put into service in the normal way by introducing pressure into 16 with the outflow from 17 nearly or entirely blocked by outflow valves below the pressure regulator proper, the full pressure of 16 would be immediately communicated to 17 but without the velocity relations and resulting pressure distributions throughout the valve normally associated with that particular opening of the plunger. As a result there would not exist the pressure differences normally available for moving the plunger and no motion would result, even were regulator control valve 34 to close completely due to pressure in 43 exceeding the setting of the spring. However, if the general pressure were to rise the small amount additionally required to open valve 21, the pressure in 6 would be reduced by the resultant discharge and accordingly the pressure difference created would cause the plunger to move in the closing direction until it throttled the main flow to the point where the pressure in 17 approached normal and the necessary pressure differences were set up to permit valve 34 to control the plunger movements, valve 21 closing as normal conditions were restored.

It is thus seen that in the specific example above given the pressure is normally regulated between 65 and 70 lbs. although it will of course be understood that by adjusting the collars 25 on both of the regulators 23 and 43, the pressure range may be varied as desired. It will also be seen that if the pressure drops below 65 lbs. the plunger will be in its full open position due to control valve 34 being fully opened but when the pressure rises above 65 lbs. it then starts to close. Hence, with the downstream pressure somewhere between 65 and 70 lbs. the plunger will be in some intermediate position and with normal variations in the pressure in either direction from this intermediate pressure the plunger will move so as to increase or decrease the flow and maintain the downstream pressure in 17 between the narrow limits.

Figure 6:
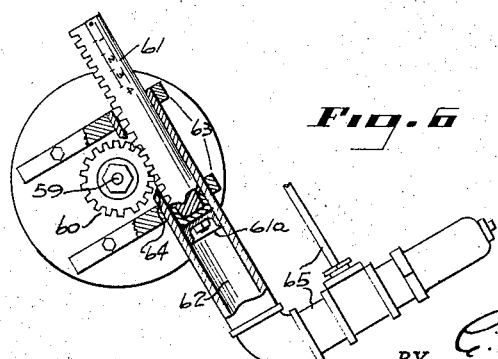
Fig. 6 is an enlarged partial sectional view of the outer pinion and plunger of the restoring mechanism.

To insure stability of operation even under the most exacting conditions, such as where the supply pipe or distribution pipes are several thousand feet in length and are not provided possibly even with a stand pipe in the system, I have provided improved restoring mechanism for controlling the pilot regulator 43. This restoring mechanism includes a rack member 57 having a series of circular teeth and which is suitably bolted to the rear of plunger 4. Upon movement of the plunger this rack drives a pinion 58, Fig. 5, shaft 59 extending outwardly through the inner and outer casings and pinion 60 which meshes with a plunger rack 61. This plunger rack is formed preferably on one side of a rod guided in a cylinder 62. This cylinder is suitably clamped in bracket 63 and has a cutaway portion 64 to permit pinion 60 to mesh with rack 61. The lower end of rack rod 61 carries preferably a leather cup washer 61a, Fig. 6. As the main valve plunger 4 moves rearwardly to open, the restoring plunger 61a is moved downwardly to force liquid contained in the cylinder 62, through a pipe 65 to a pair of sylphon bellows 66, the free ends of which are connected by a cross member 67 in turn rigidly but adjustably connected to the valve stem 22a. The upper ends of the bellows are immovably held by brackets 68 extending laterally from the side arms 26a of the pilot regulator 43. As the fluid in cylinder 62 is thus forced into bellows 66 valve stem 22a tends to move downwardly thus exerting a closing force upon the pilot regulator valve 34 and retarding opening movement of plunger 4. To permit a gradual easing of the restoring fluid pressure so as to obtain a compensating action in the restoring operation, a manually adjustable by-pass valve 69 is provided whereby the pressure fluid may be vented from the bellows 66 to a storage chamber 70. Upon closing movement of the main valve plunger the restoring plunger 64 would be moved upwardly and thus tend to reduce the pressure in the bellows 66 and hence tend to oppose control by the pilot regulator to an extent determined by the rate at which fluid would flow from the chamber 70 through by-pass valve 69 back into the bellows.

It is thus seen that even under the most exacting conditions of operation my improved restoring mechanism would insure the utmost stability of operation, and accordingly freedom from pressure surges in the supply pipe, while by the general arrangement of the auxiliary and pilot regulators I have provided a relatively simple arrangement whereby the main valve may be effectively controlled and operated to maintain downstream pressure within some desired range.

In the modification of Figure 7 I have shown a usual form of Johnson valve generally similar in construction to the preferred form, but having slightly different fluid passages and pilot and auxiliary pilot regulators. It will be seen that fluid flows from the upstream pipe 16 through a restricted orifice 71 in the nose of the plunger 72 through an opening 73 formed in the rear partition of plunger 72 and thence through the hollow rack member 74 to the central or internal chamber 75. A member 76 projects forwardly from the rear closed portion of the inner casing 77 and has a flat portion 78 of a gradually increasing depth toward the rear thereof. It is thus seen that as the plunger moves forwardly the supply of fluid pressure to central chamber 75 will be gradually reduced. To control the plunger a pilot regulator 79, identical to the auxiliary pilot regulator described in the preferred form, operates a control valve 80 to permit exhaust of fluid from the central chamber 75 through a pipe 81 to the downstream pipe 17 while the control of fluid pressure in the annular chamber 82 is obtained as by an auxiliary pilot regulator 83 actuating a control valve 84 disposed in a pipe 85 leading from the annular chamber to any suitable source of low pressure such as the atmosphere. To control the regulators in accordance with the pressure in the downstream pipe 82 there is provided a pipe 86 connected into the downstream pipe and to the pressure chambers of the regulators 79 and 83 whereupon it will be seen that as pressure in the downstream pipe rises above say 65 lbs., regulator valve 80 will begin to close, thus causing fluid pressure to be accumulated in the central chamber 75, and hence cause a closing force to be exerted upon the plunger 72 which will tend to gradually move toward closing position. The action of main regulator 80 and auxiliary regulator 84 will then be exactly the same as 34 and 21 of the preferred form of my device, except that the supply to 75 is thru an orifice variable with the plunger position instead of thru pipe 52. It will be seen that as the plunger moves toward closing position the flat portion 78 gradually decreases the rate at which the plunger closes and accordingly contributes to the stability of pressure regulation. The several chambers and passages are provided with suitable valve controlled drain pipes 88 which are normally closed.

It is thus seen that in both forms of my improved valve and regulator controls, there is provided an arrangement of elements which is most effective in controlling the pipe line pressure and that in each case mechanism is provided for retarding the closing movements of the valve. The central rack is carried by the plunger in the modified form and is used to actuate a plunger position indicator which is well known in the art.

Figure 8:
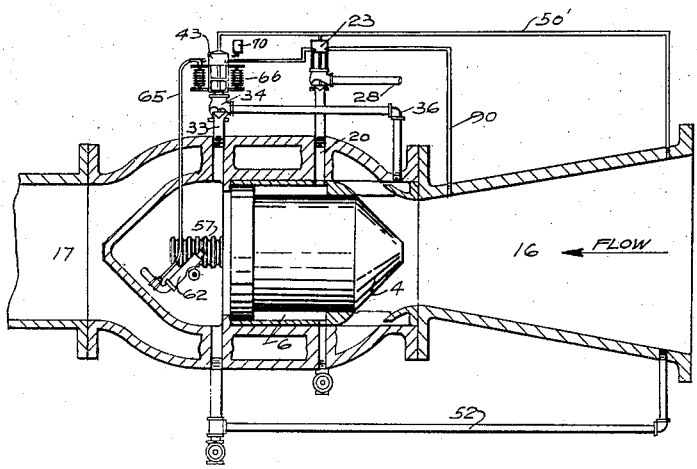

To adapt the valve to various services other than pressure regulation while retaining either substantially or exactly the arrangements of control valves 34 and 21 (or 80 and 81), I simply alter the motive means 43 and 23 (or 79 and 83). For flow regulation, i. e., to maintain a constant rate of flow from a higher pressure in 16 to a lower pressure in 17, regardless of how that pressure difference may vary, I provide as shown in Fig. 8 a connection 50' leading from a point of high pressure to the upper side of each of the piston and cylinder operating means 43 and 23, the same as in the preferred form, although the pipe is taken from the upstream side of the conduit valve. A second control pipe 90 leads from a point of low pressure, such as the throat of the venturi, to the lower side of both the regulator actuating pistons of 43 and 23. The pilots 23 and 43 with pressures on each side of their pistons, are thus independent of absolute pressure, being sensitive only to differential pressures at the inlet and throat of the venturi which sensitiveness is a function of flow or quantity. If desired, Pitot tubes or other devices well known in the art may be used to obtain the necessary pressure differential.

Figure 9:
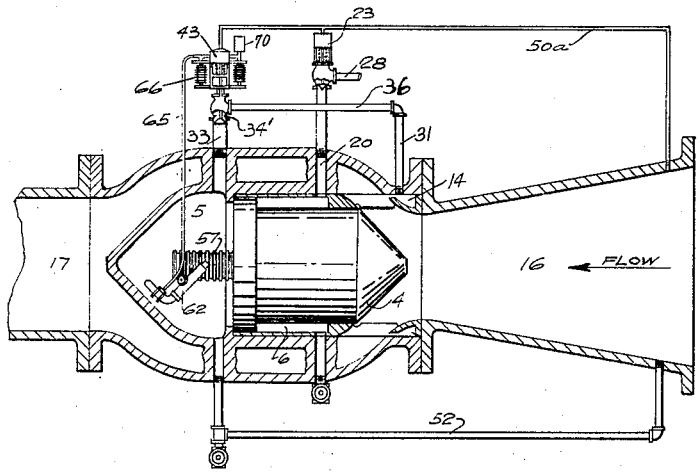
Figs. 8, 9 and 10 are diagrammatic views showing other applications of the valve and its control.

For pressure relief, i. e., the discharge from a conduit of any quantity of fluid tending to raise its pressure above a predetermined value, I would use the same type of motive means as shown with my preferred disclosures, but as shown in Fig. 9 I alter the direction of action of valve 34 by providing a valve 34' and connect the motive means 43 therefor to the upstream conduit in which it is desired to limit the pressure. The result is that any increase of pressure above the setting of the control valve spring would cause valve 34' to open and allow the main valve to open and discharge an appropriate amount of fluid.

Figure 10:
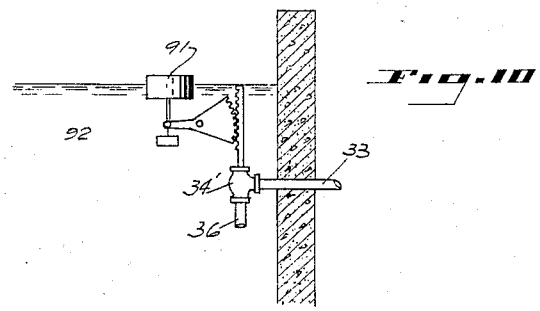

For water regulation of a reservoir by control of the inflow I substitute for the operating means 43 of Fig. 8 a motive means actuated by a float 91, Fig. 10 disposed within a reservoir 92 and suitably actuated, e. g. by a quadrant and rack on the valve stem to control valve 34 of the Fig. 8 form, thereby to secure the necessary direction of the responsive movement of the main plunger. In Fig. 10, valve 34' is positioned within or near the reservoir instead of at the main valve, the pipe 33 leading to the main valve while the discharge pipe 36 is shown as discharging directly into the reservoir instead of into a low pressure point in the pipe line, although this latter arrangement may be employed as shown in the other figures. For Figure 10 the control pipe 50' and the auxiliary pilot regulator may, in most cases, be entirely omitted. There is also omitted the restoring mechanism including the elements 62, 65 and 66 as the valve mechanism 34' is now actuated solely by the float control.

In the arrangement of this Fig. 10 modification it is seen that as the level in the reservoir 92 falls, valve 34' opens thereby permitting fluid in the internal or central fluid chamber 5 to discharge through pipes 33 and 36 and thus permit the valve to open. The water in the pipe to the reservoir or tank thus discharges to maintain a predetermined level therein.

For water regulation of the reservoir by control of the outflow, there could be used the arrangement described above, except that pipe 36 instead of discharging into the reservoir, would be carried back to discharge at one of the described low pressure areas within the valve, or to some other region of pressure lower than that resulting from the reservoir water level.

In each of the modifications of Figs. 8 and 9 restoring mechanism, such as shown in the preferred form, is employed, this being merely diagrammatically illustrated in these figures and given the same reference numbers. There are many and varied purposes to which I might apply the general valve arrangement and operating system as described herein, simply by the appropriate selection and arrangement of the main and auxiliary control valves and their motive means and it is to be understood that this application is to cover any and all such uses.

While the foregoing describes certain forms which my invention may assume it is obvious that other modifications may be employed without departing from the spirit of my invention as set forth in the appended claims.

I claim:

1. Controlling mechanism for a fluid conduit comprising, in combination, a valve mechanism having inner and outer casings spaced to form an annular fluid passageway therebetween and a plunger telescopically supported by said inner casing, said valve mechanism being disposable between up and downstream pipes of the conduit with the plunger pointing against the normal direction of fluid flow through the conduit, means for actuating said plunger in opposite directions by hydraulic fluid pressure, and means for effecting different throttling positions of said plunger to maintain substantially constant pressure in the downstream pipe automatically in accordance with pressure variations in the fluid conduit.

2. Controlling mechanism for a fluid conduit comprising, in combination, a valve mechanism adapted to be interposed between up and downstream pipes of the conduit and having inner and outer casings spaced to form a relatively smooth annular fluid passageway therebetween, a plunger telescopically arranged with said inner casing, a piston element operatively connected to said plunger, means for actuating said piston by fluid pressure, and means for controlling the actuating fluid pressure so as to move the valve in an opening direction automatically upon occurrence of a drop in pressure in the downstream pipe below a predetermined substantially constant value.

3. Controlling mechanism for a fluid conduit comprising, in combination, a valve mechanism adapted to be interposed between up and downstream pipes of the conduit and having a casing forming a valve seat and a plunger guide cylinder, a plunger slidably disposed in said cylinder and having provision therewith to form opening and closing fluid pressure chambers whereby the plunger may be moved in opposite directions by fluid pressure, means for supplying actuating fluid pressure to said chambers, actuating fluid control valves, one for each of said chambers, and means for operating said control valves so as to move the plunger in an opening direction upon occurrence of a drop in pressure in the downstream pipe below a predetermined substantially constant value and in a closing direction upon occurrence of a rise in pressure in the downstream pipe above said value.

4. Controlling mechanism for a fluid conduit comprising, in combination, a valve mechanism adapted to be interposed between up and downstream pipes of the conduit and having a movable valve element, means forming opening and closing fluid pressure chambers for said valve element, control valves, one for each chamber, means for supplying fluid pressure to said chambers, and means whereby said control valves control the discharge of fluid pressure from their respective chambers to effect either opening or closing valve movement automatically in accordance with a drop or rise respectively in the downstream pipe.

5. The combination set forth in claim 4, further characterized by the provision of means for constantly supplying fluid pressure to one of said chambers.

6. The combination set forth in claim 4 further characterized by the provision of means for constantly supplying fluid pressure to both of said chambers.

7. Control mechanism for a fluid conduit comprising, in combination, valve mechanism adapted to be interposed between up and downstream pipes of the conduit and having inner and outer casings spaced to form a relatively smooth annular fluid passageway therebetween, a plunger telescopically arranged with said inner casing to form a central chamber and having provision to form also an annular chamber, control valves, one for each of said chambers, adapted to permit each of said chambers to communicate with a point of low pressure in the fluid conduit, means for supplying actuating fluid to said chambers, and means for sequentially opening or closing said control valve automatically in accordance with pressure variation in the flow conduit.

8. Controlling mechanism for a fluid conduit comprising, in combination, a valve mechanism adapted to be interposed between up and downstream pipes of the conduit and having a movable valve element for controlling fluid flow therethrough, means for actuating said valve element in opposite directions by hydraulic fluid pressure, means for controlling said actuating means so as to effect said opposite movement automatically in accordance with pressure variations in the conduit, and a fluid pressure operated restoring mechanism for said control means, rendered operative upon movement of said valve element.

9. Controlling mechanism for a fluid conduit comprising, in combination, a valve mechanism adapted to be interposed between up and downstream pipes of the conduit and having a movable valve element for controlling fluid flow therethrough, means forming opening and closing fluid pressure chambers whereby said valve element may be moved in opposite directions by fluid pressure, a valve adapted to control the actuating fluid for one of said chambers, fluid pressure means for effecting operation of said control valve automatically in accordance with pressure conditions in said conduit, and fluid operated restoring mechanism between said valve element and said control valve.

10. Controlling mechanism for a fluid conduit comprising, in combination, a valve mechanism having a movable valve element and opening and closing fluid pressure operating chambers therefor, a pilot regulator valve for one of said chambers, an auxiliary pilot regulator valve for the other of said chambers, means for automatically controlling said regulators in accordance with the conduit pressure, and restoring mechanism between said valve element and one of said regulators.

11. Controlling mechanism for a fluid conduit comprising, in combination, a valve mechanism having a movable element and opening and closing fluid pressure operating chambers therefor, a main pilot regulator valve for one of said chambers, an auxiliary pilot regulator valve for the other of said chambers, means for automatically controlling said regulators in accordance with the conduit pressure, and restoring mechanism between said valve element and said main pilot regulator.

12. Controlling mechanism for a fluid conduit comprising, in combination, a valve mechanism adapted to be interposed between up and downstream pipes of the conduit and having a movable valve element, means forming opening and closing fluid pressure chambers for said valve element, a pilot regulator valve for said opening chamber, an auxiliary pilot regulator valve for said closing chamber, said regulators being adapted to control the discharge of fluid from their respective chambers and being so relatively adjusted that when one is closed the other is adapted to be open, thereby holding the valve element in a closed position, and means whereby said regulators are operable automatically to maintain a substantially constant predetermined pressure in the downstream pipe.

13. Controlling mechanism for a fluid conduit comprising, in combination, a valve mechanism adapted to be interposed between up and downstream pipes of the conduit and having a movable valve element, means forming opening and closing fluid pressure chambers for said valve element, a pilot regulator valve for said closing chamber, an auxiliary pilot valve regulator for said opening chamber, said regulators being adapted to control the discharge of fluid from their respective chambers and being so relatively adjusted that when the regulator is closed, the auxiliary regulator is adapted to be open, thereby holding the valve element in a closed position, and means for first initiating closure of said opened auxiliary regulator and subsequently opening the closed regulator automatically in accordance with a drop in pressure in the downstream pipe below a given value whereby the valve element is moved in an opening direction so as to maintain pressure in the downstream pipe at substantially said given value.

14. Controlling mechanism for a fluid conduit comprising, in combination, a valve mechanism adapted to be interposed between up and downstream pipes of the conduit and having a movable valve element for controlling fluid flow therethrough, actuating means for said valve element, a plurality of regulator valves for said actuating means adapted to effect closing movement of said valve element automatically in accordance with an increase in pressure conditions in the downstream pipe, and restoring mechanism for said control means operatively connected to said valve element.

15. Controlling mechanism for a fluid conduit comprising, in combination, a valve mechanism adapted to be interposed between up and downstream pipes of a conduit and having a movable valve element, means for moving said valve element in closing and opening directions including fluid pressure closing and opening chambers, regulator valves one for each of said chambers for controlling fluid pressure therein, said regulator valves each having its own pressure expansible element for moving its regulator valve, and means for controlling said regulator valves automatically in accordance with pressure variations in said conduit so as to maintain a substantially constant pressure in the downstream side of said conduit.

16. Controlling mechanism for a fluid conduit comprising, in combination, a valve mechanism adapted to be interposed between up and downstream pipes of a conduit and having inner and outer casings spaced to form a relatively smooth annular fluid passageway therebetween, a plunger telescopically arranged with said inner casing, means forming opening and closing fluid pressure chambers for said plunger, regulator valves one for each of said chambers adapted to control the fluid pressure in each of said chambers, and means for controlling said regulator valves automatically in accordance with pressure variations in said conduit so as to maintain a substantially constant predetermined pressure in the downstream pipe of said conduit.

17. Controlling mechanism for a fluid conduit comprising, in combination, a valve mechanism adapted to be interposed between up and downstream pipes of a conduit and having inner and outer casings spaced to form a relatively smooth annular fluid passageway therebetween, a plunger telescopically arranged with said inner casing, means forming opening and closing fluid pressure chambers for said plunger, regulator valves one for each of said chambers adapted to control the fluid pressure in each of said chambers, means forming a circular space around said conduit and communicating therewith, a fluid connection between one of said regulators and said space, and means for controlling said regulator valves automatically in accordance with pressure variations in said conduit so as to maintain a substantially constant predetermined pressure in the downstream pipe of said conduit.

18. Control mechanism for a fluid conduit comprising, in combination; a plunger type valve adapted to be interposed between up and downstream pipes of the conduit and having the plunger movable in an upstream direction during closing movement; means forming opening and closing fluid pressure chambers for said plunger; and means for controlling the fluid pressure in at least one of said chambers, irrespective of whether the pressure fluid is controlled in the other of said chambers, automatically in accordance with pressure variations in said conduit so as to maintain a substantially constant pressure in the downstream conduit.

19. The combination set forth in claim 8 further characterized in that said fluid operated restoring mechanism includes means for bypassing pressure fluid from the restoring mechanism thereby to effect a compensating action in the restoring operation.

20. The combination set forth in claim 8 further characterized by the provision of adjustable means for bypassing fluid from the restoring mechanism to compensate for the initial restoring movement on the control means.

21. The combination set forth in claim 8 further characterized by the provision of means for bypassing fluid from the restoring mechanism during one direction of restoring action and to admit fluid to the restoring mechanism during the opposite direction of restoring action thereby to effect a compensating action on the restoring operation during either direction of movement of the conduit valve.

22. Controlling mechanism for a fluid conduit comprising, in combination, a valve mechanism having inner and outer casings spaced to form an annular fluid passageway therebetween, a plunger telescopically supported by said inner casing and pointing against the direction of normal fluid flow through the conduit in which the valve mechanism is disposed, fluid pressure means for moving said plunger, and means for controlling plunger actuating fluid pressure automatically in accordance with pressure variations in the conduit to maintain a substantially constant fluid condition therein.

23. The combination set forth in claim 22 further characterized by the provision of restoring mechanism operated by movement of said plunger to effect a restoring action on said control means.

CHARLES V. FOULDS.